United States Patent
Kuelbs (10) Patent No.: US 7,518,253 B2
(45) Date of Patent: Apr. 14, 2009

(54) SOLAR WIND CHIME

(75) Inventor: Gustav P. Kuelbs, Grapevine, TX (US)

(73) Assignee: World Factory, Inc., Irving, TX (US)

(*) Notice: Subject to any disclaimer, the term of this patent is extended or adjusted under 35 U.S.C. 154(b) by 0 days.

(21) Appl. No.: 12/049,936

(22) Filed: Mar. 17, 2008

(65) Prior Publication Data

US 2008/0191491 A1 Aug. 14, 2008

Related U.S. Application Data

(63) Continuation of application No. 11/224,212, filed on Sep. 12, 2005, now Pat. No. 7,345,371.

(60) Provisional application No. 60/672,793, filed on Apr. 19, 2005, provisional application No. 60/649,630, filed on Feb. 2, 2005.

(51) Int. Cl.
*F02B 63/04* (2006.01)
*G10D 13/08* (2006.01)
*B60Q 1/26* (2006.01)

(52) U.S. Cl. .............. 290/1 R; 60/641.12; 84/402; 323/906; 362/192; 340/392.1; 340/393.2

(58) Field of Classification Search .............. 290/1 R; 60/641.11, 641.12, 659; 320/101; 323/906; 84/402; 362/253, 192; 340/392.2, 392.5, 340/392.4, 392.1, 393.2
See application file for complete search history.

(56) References Cited

U.S. PATENT DOCUMENTS

| | | | | |
|---|---|---|---|---|
| 4,387,999 | A * | 6/1983 | Shelley | 368/15 |
| 4,702,140 | A * | 10/1987 | Goldfarb | 84/609 |
| 5,208,578 | A * | 5/1993 | Tury et al. | 340/392.2 |
| 5,369,391 | A * | 11/1994 | Gadsby | 340/392.5 |
| 5,587,697 | A * | 12/1996 | Rent | 340/392.4 |
| 5,831,516 | A * | 11/1998 | Jennings | 340/392.4 |
| 6,124,782 | A * | 9/2000 | Kraft, Sr. | 340/393.2 |
| 6,166,660 | A * | 12/2000 | Grenier | 340/932.2 |
| 6,441,284 | B1 * | 8/2002 | Greene | 84/402 |
| 7,336,157 | B2 | 2/2008 | Richmond | |
| 2002/0180404 | A1 * | 12/2002 | Benn et al. | 320/101 |
| 2005/0040785 | A1 * | 2/2005 | Barnes et al. | 320/101 |
| 2005/0279403 | A1 * | 12/2005 | Kube | 136/291 |
| 2007/0019404 | A1 | 1/2007 | Chen | |
| 2007/0175315 | A1 * | 8/2007 | Maeng | 84/402 |
| 2008/0291665 | A1 * | 11/2008 | Wijaya et al. | 362/183 |

FOREIGN PATENT DOCUMENTS

JP 03139698 A * 6/1991

* cited by examiner

*Primary Examiner*—Julio Gonzalez
(74) *Attorney, Agent, or Firm*—James E. Walton (57) ABSTRACT

A solar-powered wind chime has a solar energy system for powering an electrical subsystem. The electrical subsystem may include lighting elements for illuminating the wind chime and the area around the wind chime in a decorative and functional manner.

2 Claims, 8 Drawing Sheets

SOLAR WIND CHIME

This application is a continuation of U.S. application Ser. No. 11/224,212, filed 12 Sep. 2005 now U.S. Pat. No. 7,345,371, which is hereby incorporated by reference for all purposes as if fully set forth herein, and which claims the benefit of U.S. Provisional Application No. 60/672,793, filed 19 Apr. 2005, and U.S. Provisional Application No. 60/649,630, filed 2 Feb. 2005, both of which are hereby incorporated by reference for all purposes as if fully set forth herein.

BACKGROUND

1. Field of the Invention

The present invention relates in general to the field of wind chimes.

2. Description of Related Art

There are many designs of wind chimes well known in the art. Wind chimes are typically used outdoors; however, some wind chimes are used indoors or outdoors in an area that is protected from the environment. At night, or in otherwise poorly illuminated locations, it is difficult to visually inspect a wind chime or fully appreciate the decorative nature of a wind chime. While there are many wind chimes well known in the art, considerable room for improvement remains.

SUMMARY OF THE INVENTION

There is a need in the art for providing a solar-powered wind chime. Therefore, it is an object of the present invention to provide a solar-powered wind chime.

This object is achieved by providing a solar-powered wind chime having a solar energy system and a rechargeable electrical power source that is recharged, at least partially, by the solar energy system. The electrical power is used to power lighting elements or other electrical subsystems operably associated with the wind chime.

The present invention provides significant advantages, including: (1) the wind chime can be illuminated for visual inspection at night or when the wind chime is located in a poorly illuminated space; (2) decorative elements of the wind chime can be illuminated; and (3) other electrical subsystems, such as sound systems, microphone systems, electrical receivers and transmitters, and various electromechanical systems can be operably associated with the wind chime.

Further objects and advantages of this invention will become apparent from a consideration of the drawings and ensuing description.

DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DETAILED DESCRIPTION OF THE PREFERRED EMBODIMENT

Figure 1A:
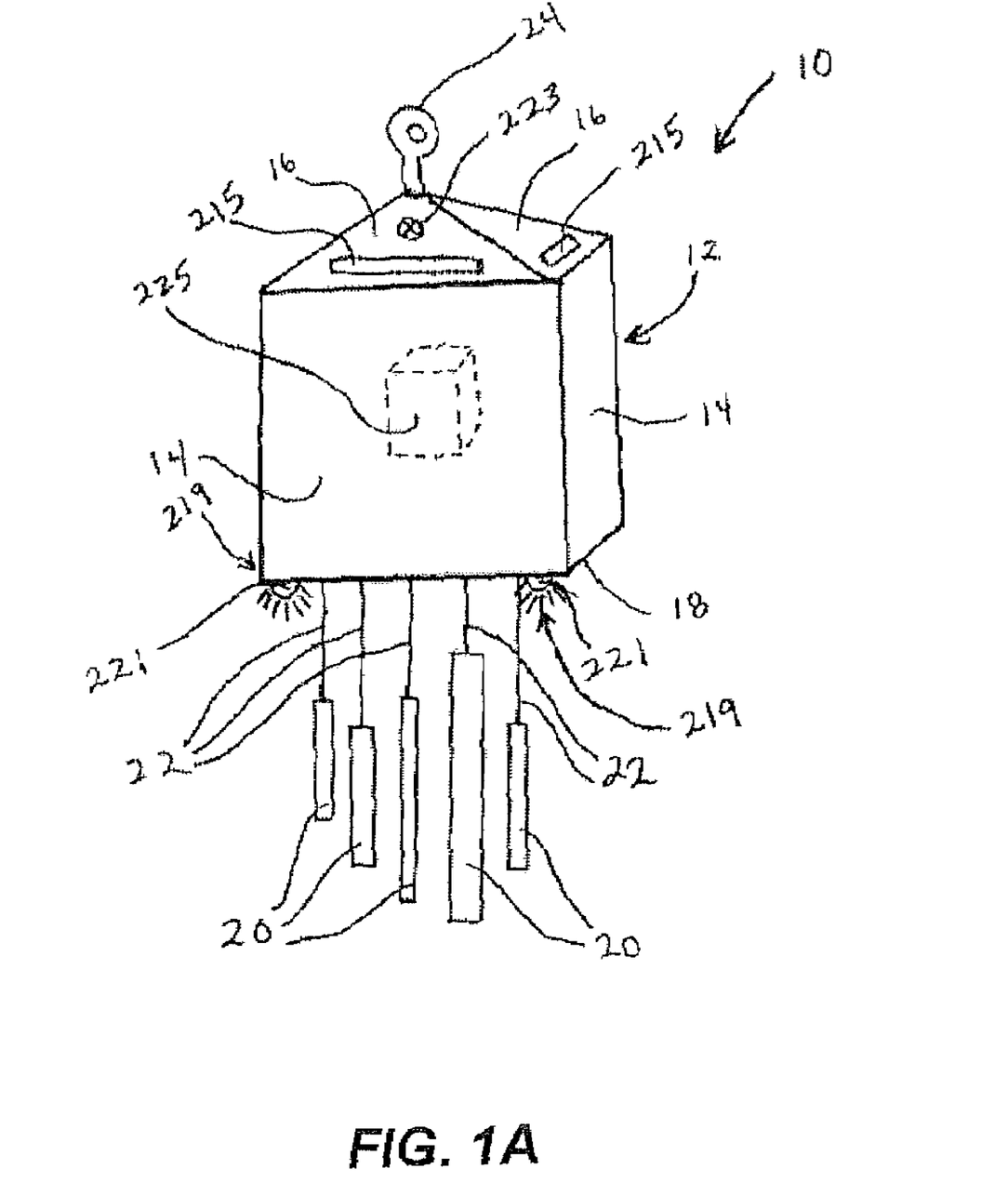
FIGS. 1A-1C are perspective views of the preferred embodiments of a solar-powered wind chime according to the present invention.

Referring to FIG. 1A in the drawings, a preferred embodiment of a solar wind chime 10 according to the present invention is illustrated. Solar wind chime 10 preferably comprises a body 12, body 12 comprising side faces 14, top faces 16, and a bottom face 18. Solar wind chime 10 further comprises chimes 20 attached to bottom face 18 with strings 22. It should be appreciated that while solar wind chime 10 is illustrated as comprising chimes 20, solar wind chime may alternatively comprise other hanging accessories, decorative elements, or devices in combination with or in place of chimes 20 (see FIGS. 3-6). Solar wind chime 10 preferably comprises a hanger 24 attached to an upper part of body 12. Solar wind chime 10 further comprises an enclosure 225 and a solar energy system 201 (see FIG. 2).

Solar wind chime 10 is preferably suspended from a support structure (not shown) by attaching hanger 24 to the support structure. Hanger 24 is preferably an eyebolt adapted for suspending solar wind chime 10 from a support structure; however, hanger 24 may alternatively be a clasp, hook, or other suitable device or apparatus. It should be appreciated that while body 12 is preferably substantially box shaped, body 12 may alternatively form other geometric shapes or be irregular in shape. Body 12 is preferably constructed of a weatherproof plastic but may alternatively be constructed of metal, wood, glass, or other suitable materials. Chimes 20 are preferably constructed of metal tubing, but may alternatively be constructed of wood, plastic, or other suitable material. Further, chimes 20 may not be tubular in nature but instead may comprise solid members.

It should be appreciated that alternative embodiments of solar wind chime 10 may optionally comprise a supporting structure adapted for vertically supporting the wind chime.

Figure 1B:
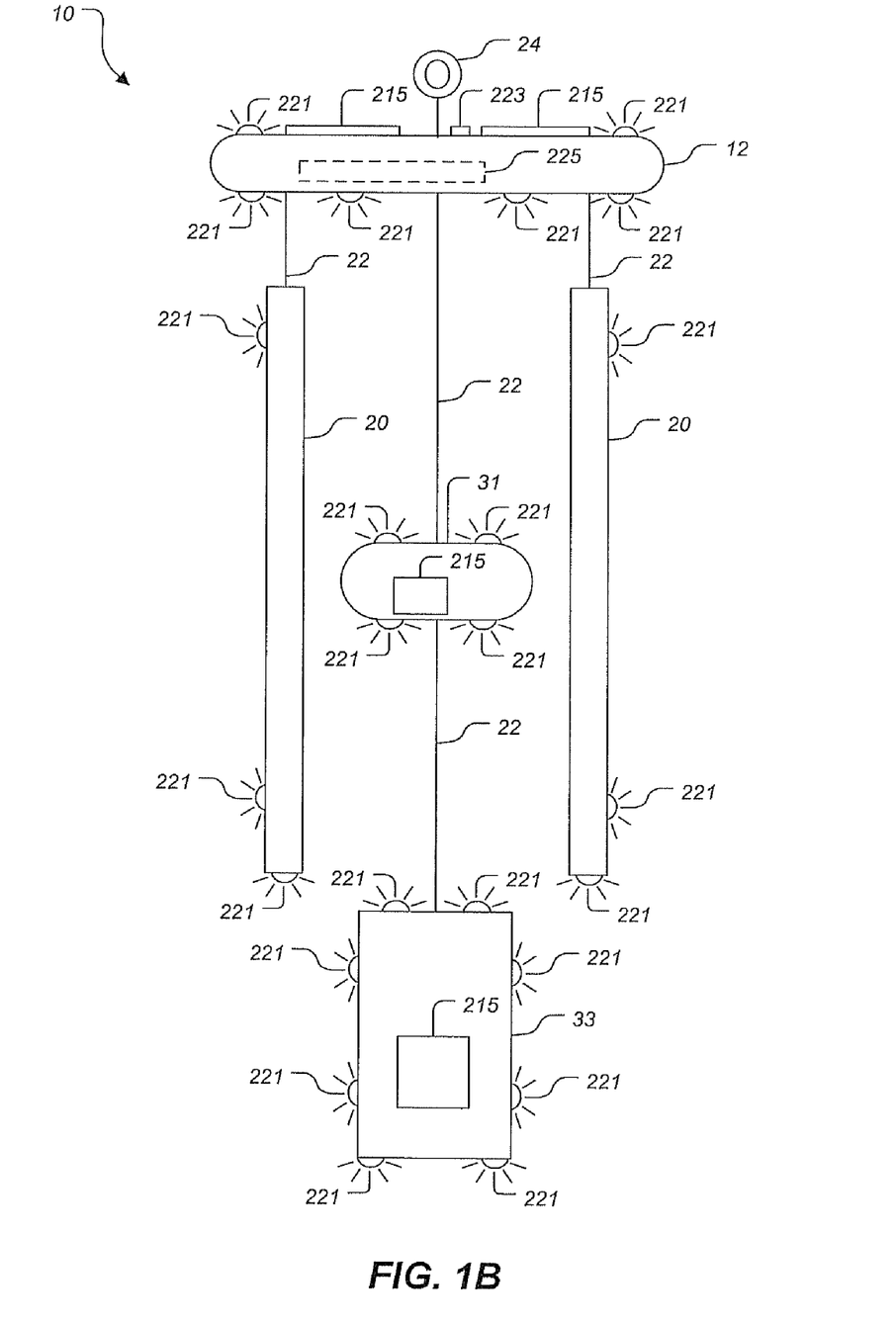

Referring to FIG. 1B in the drawings, a preferred embodiment of a solar wind chime 10 according to the present invention is illustrated. Solar wind chime 10 preferably comprises a body 12, body 12 comprising side faces, top faces, and a bottom face. Solar wind chime 10 further comprises chimes 20, striker 31, and ornamental blower 33 attached to the bottom face of body 12 with strings 22. Solar wind chime 10 preferably comprises a hanger 24 attached to an upper part of body 12. Solar wind chime 10 further comprises an enclosure 225 and a solar energy system 201 (see FIG. 2).

Solar wind chime 10 further comprises a plurality of lighting elements 221 conductively coupled to solar energy system 201, as shown and described below in FIG. 2. The plurality of lighting elements 221 may for example attach to any portion of body 12, any portion of chimes 20, any portion of striker 31, or any portion of ornamental blower 33. In addition or as an alternative, solar wind chime 10 further comprises a plurality of solar collectors 215 and photo cells 223, as described in more detail in FIG. 2. Solar collectors 215 may for example attach to any portion of body 12, any portion of chimes 20, any portion of striker 31, or any portion of ornamental blower 33.

Figure 1C:
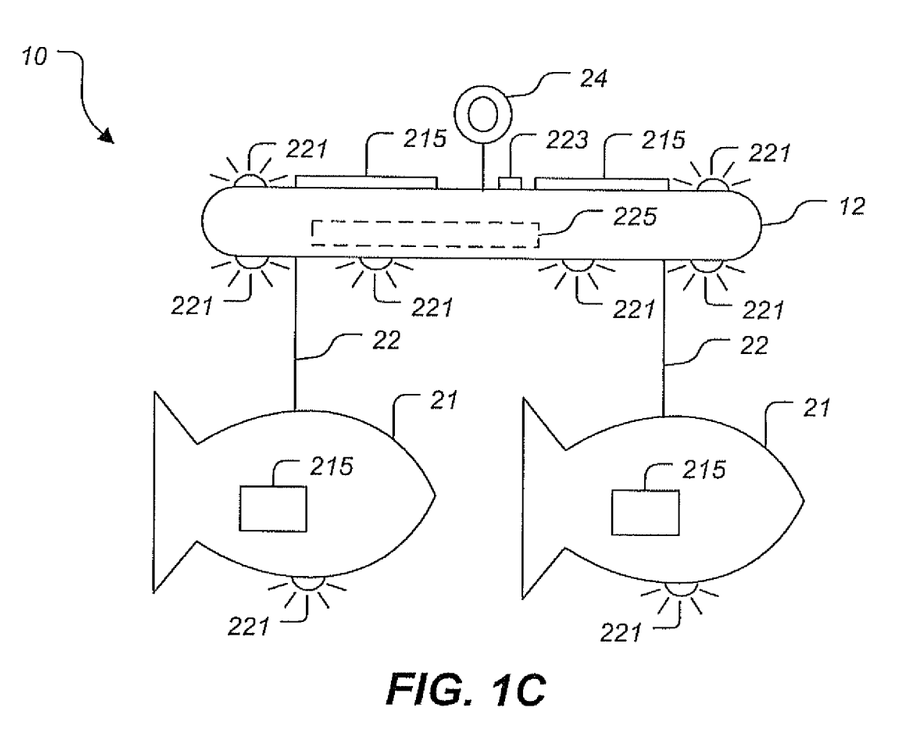

Referring to FIG. 1C in the drawings, a preferred embodiment of a solar wind chime 10 according to the present invention is illustrated. Solar wind chime 10 preferably comprises a body 12, body 12 comprising side faces, top faces, and a bottom face. Solar wind chime 10 further comprises mobile elements 21 attached to the bottom face of body 12 with strings 22. Solar wind chime 10 preferably comprises a hanger 24 attached to an upper part of body 12. Solar wind chime 10 further comprises an enclosure 225 and a solar energy system 201 (see FIG. 2).

Solar wind chime 10 further comprises a plurality of lighting elements 221 conductively coupled to solar energy system 201, as shown and described below in FIG. 2. The plurality of lighting elements 221 may for example attach to any portion of body 12 or any portion of mobile elements 21. In addition or as an alternative, solar wind chime 10 further comprises a plurality of solar collectors 215 and photo cells 223, as described in more detail in FIG. 2. Solar collectors 215 may for example attach to any portion of body 12 or any portion of mobile elements 21.

Figure 2:
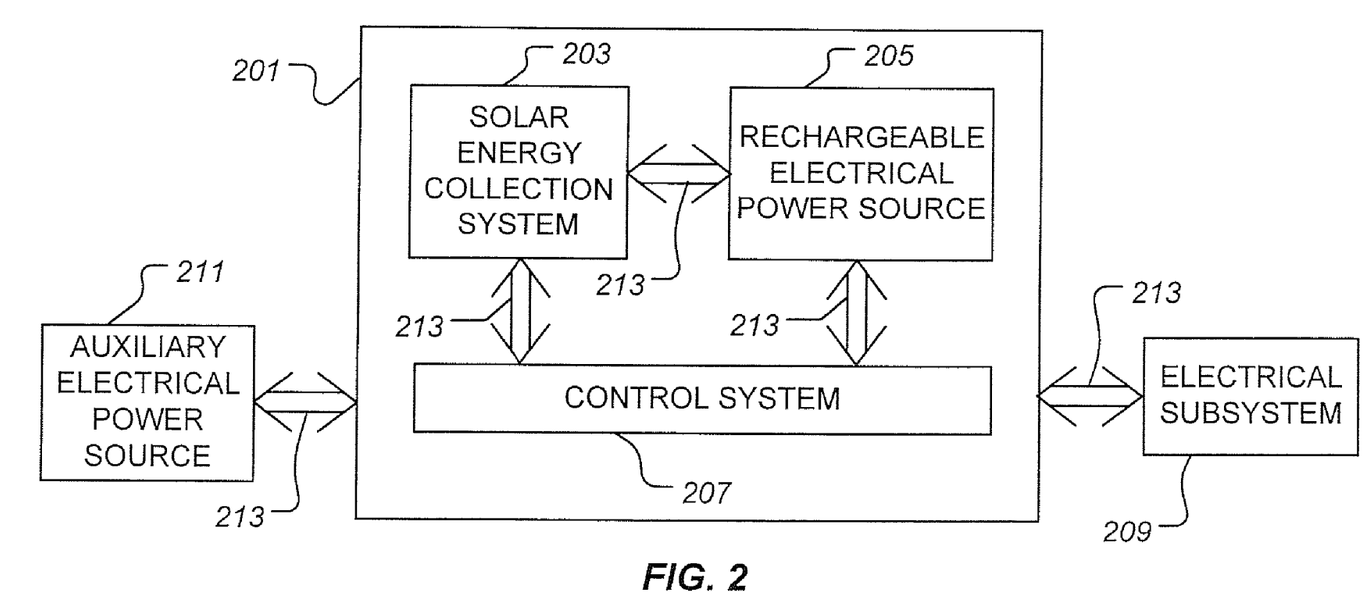
FIG. 2 is a high level schematic of the solar energy system of the solar-powered wind chime of FIG. 1.

Now referring to FIG. 2, the preferred embodiment of solar energy system 201 according to the present invention is illustrated. Solar energy system 201 preferably comprises a solar energy collection system 203, a rechargeable electrical power source 205, and a control system 207. Solar energy system 201 is preferably conductively coupled to an electrical subsystem 209. Solar energy system 201 may optionally be conductively coupled to an auxiliary electrical power source 211. Conductive coupling is preferably achieved through the use of electrical conductors 213 such as insulated copper wires, circuit boards, or other suitable devices or means for conductively coupling electrical components.

Solar energy collection system 203 preferably comprises a solar collector 215 (see FIG. 1) and other necessary circuitry for receiving and collecting solar energy and converting the solar energy into electrical energy. Solar energy collection system 203 is preferably conductively coupled to both rechargeable electrical power source 205 and control system 207 with electrical conductors 213. Rechargeable electrical power source 205 preferably comprises a rechargeable battery for storing electrical energy; however, rechargeable electrical power source 205 may alternatively comprise any rechargeable electrical power storage device, such as a capacitor, battery pack, any other suitable device for storing electrical energy, or combination thereof. Rechargeable electrical power source 205 is preferably conductively coupled to solar energy collection system 203 and control system 207 with electrical conductors 213.

The purpose of solar energy system 201 is preferably to convert solar energy into electrical energy and to supply that electrical energy to one or more electrical subsystems 209. In operation, solar energy collection system 203 preferably converts solar energy into electrical energy. Solar energy collection system 203 preferably delivers electrical energy to rechargeable electrical power source 205 to provide a trickle charge to rechargeable electrical power source 205. However, when rechargeable electrical power source 205 is fully charged, solar energy collection system 203 preferably delivers electrical energy to control system 207 where the electrical energy is preferably diverted for uses other than charging rechargeable electrical power source 205. For example, the electrical energy could be used to directly power electrical subsystem 209 rather than electrical subsystem 209 consuming power from rechargeable electrical power source 205.

Auxiliary electrical power source 211 preferably comprises an alternating current power source such as power from a conventional AC outlet; however, auxiliary electrical power source 211 may alternatively comprise a direct current power source such as a non-rechargeable battery, one or more fuel cells, a renewable energy source such as a wind powered generator, a rechargeable battery pack (in which the battery pack is removed, recharged remotely, and thereafter replaced back into auxiliary electrical power source 211), or any other electrical power source suitable for providing solar energy system 201 with additional electrical energy. Of course, the foregoing configuration allows for the interchanging, or swapping, of battery packs. Auxiliary electrical power source 211 is preferably conductively coupled to solar energy system 201 and preferably delivers electrical energy to control system 207. Auxiliary electrical power source 211 preferably supplies electrical energy for a variety of uses including: powering electrical subsystem 209, recharging rechargeable electrical power source 205, and powering other solar energy system 201 circuitry such as control system 207.

Alternative embodiments of solar energy system 201 may not include the solar energy collection system 203. Instead, solar energy system 201 may comprise a circuit for powering electrical subsystem 209 operable only by electrical energy supplied by auxiliary electrical power source 211.

Control system 207 preferably comprises circuitry, microprocessors, memory devices, sensors, switches, and other electronic components necessary to: partially or fully direct electrical energy from solar energy collection system 203 to rechargeable electrical power source 205, fully or partially direct electrical energy from solar energy collection system 203 to electrical subsystem 209, allow a user to manually switch solar energy system 201 on and off, receive input to alter or control the performance of the recharging of rechargeable electrical power source 205 and/or the supply of electrical energy to electrical subsystems 209, control the performance of electrical subsystems 209, fully or partially charge rechargeable electrical power source 205 with electrical energy supplied by auxiliary electrical power source 211, and fully or partially power electrical subsystem 209 with electrical energy from auxiliary power source 211.

It should be appreciated that while solar energy system 201 comprises control system 207 in this preferred embodiment, simpler and less sophisticated embodiments of solar energy system 201 are possible. For example, solar energy system 201 may not comprise control system 207, but merely comprise solar energy collection system 203 and rechargeable electrical power source 205 conductively coupled to each other with electrical conductors 213.

As illustrated in FIG. 1, electrical subsystem 209 is preferably a lighting subsystem 219 for providing illumination. Lighting subsystem 219 preferably comprises lighting elements 221 conductively coupled to solar energy system 201. Lighting elements 221 are preferably light emitting diodes (LEDs), but may be organic light emitting diodes, incandescent bulbs, cold cathode ray tubes, fluorescent lights, or any other suitable electrical lighting apparatus, or combination thereof. It should be appreciated that the electrical subsystem 209 of alternate embodiments of the present invention may be a water pumping subsystem, sound subsystem, video subsystem, microphone subsystem, receiving and transmitting subsystem, motion actuating subsystem, cooling subsystem, heating subsystem, raising and lowering subsystem, water agitation subsystem, electrical motor subsystem, any other electrically powered subsystem, or combination thereof.

A translucent shield, a lens, reflector, light fixture, or a combination of these may optionally be attached to or operably associated with lighting subsystem 219 to enhance or alter the illumination provided by lighting elements 221. The optional shields, lenses, reflectors, and fixtures may also be configured to prevent water, dirt, or other particulate matter from interfering with the operation of lighting elements 221.

Further, it should be appreciated that the optional shields, lenses, reflectors, and fixtures may be incorporated into any embodiment of the present invention.

It should be appreciated that lighting subsystem 219 and control system 207 may include selected components, circuitry, and microprocessor control chips to produce a variety of optional features. For example, optional features may include: manual lighting intensity controls, blinking lights, fading lights, changing the light color, motion activated lighting, sound activated lighting, a wide variety of lighting sequence or motion effects, and any other appropriate lighting effects or interactive means for controlling lighting effects. Of course, any components, circuitry, microprocessor control chips, or other means of controlling or altering the functionality of electrical subsystem 209 would be conductively coupled to solar energy system 201, electrical subsystem 209, and/or auxiliary electrical power source 211. Further, where electrical subsystem 209 is not a lighting subsystem 219, it should be appreciated that similar controls, programming capabilities, interactive input devices, and other electrical subsystem 209 performance controls or alteration means may be incorporated into the electrical subsystem 209 and/or the associated control system 207.

A photo resistor, or photo cell 223 (see FIG. 1), is preferably incorporated into the preferred embodiment of control system 207. Photo cell 223 detects the presence of light and controls whether lighting elements 221 provide illumination, by switching lighting elements 221 on or off, or by regulating the intensity of light provided by lighting elements 221. For example, when photo cell 223 detects a substantial amount of light, lighting elements 221 are switched off and provide no illumination. However, when photo cell 223 detects a low level of light, lighting elements 221 are switched on and provide illumination. Alternatively, photo cell 223 may be used to dim or brighten the output of lighting elements 221. In addition, one or more on-off switches or buttons may be incorporated into control system 207 to facilitate the operation of solar energy system 201, or to vary the operation and control of solar energy system 201, auxiliary electrical power source 211, or electrical subsystem 209. It will be appreciated that the operation of solar energy system 201, auxiliary electrical power source 211, and electrical subsystem 209 may be controlled remotely by infrared light, radio wave, or other types of transmitters and receivers.

It should be appreciated that solar energy system 201 may further comprise or be conductively coupled to a connection port for conveniently interfacing solar energy system 201 with other components, systems, subsystems, or any other suitable devices. The connection port is preferably conductively coupled with control system 207; however, connection port may alternatively be conductively coupled to any other component of solar energy system 201, auxiliary electrical power source 211, or electrical subsystem 209. More specifically, connection ports may be adapted to interface with electrical devices electrical devices having power plugs compatible with the connection port. Connection ports would be a great convenience because electrical devices such as lights, fans, radios, or other suitable electrical devices could be supplied power or controlled by solar energy system when connected to the connection port.

Components of solar energy system 201, auxiliary electrical power source 211, and electrical subsystem 209 may be located substantially near each other. For example, in the preferred embodiment, with the exceptions of solar collectors 215, photo cell 223, and lighting elements 221, much of the circuitry of solar energy system 201, auxiliary electrical power source 211, and electrical subsystem 209 is preferably substantially housed within an enclosure 225 (see FIG. 1). It should be appreciated that the components of solar energy system 201, auxiliary electrical power source 211, and electrical subsystem 209 are preferably substantially protected such that water, dirt, and other matter is prevented from interfering with the operation of solar energy system 201, auxiliary electrical power source 211, and electrical subsystem 209. It should also be appreciated that in alternative embodiments, components of solar energy system 201, auxiliary electrical power source 211, and electrical subsystem 209 may not be housed in enclosure 225 and may be located substantial distances from each other while remaining conductively coupled. For example, an alternative embodiment of the present invention may be configured such that solar collector 215 is located on a home rooftop and is conductively coupled to rechargeable electrical power source 205, other components, systems, and/or subsystems which are located a significant distance away from solar collector 215, such as near the ground level of the home.

It should be appreciated that enclosure 225 may alternatively be adapted to carry all or substantially all of the components of solar energy system 201, electrical subsystem 209, and auxiliary electrical power source 211. In alternative embodiments of the present invention, enclosure 225 may be shaped and adapted for easy connection to and disconnection from the structure supporting enclosure 225. For example, an embodiment of enclosure 225 may allow enclosure 225 to be removably attached to the structure supporting enclosure 225, subsequently detached from the structure, and later removably attached to a different supporting structure. Alternatively, enclosure 225 may be integrally or sealably attach to a supporting structure. For example, enclosure 225 may be attached such that it passes through a hole in a supporting structure and forms a watertight seal with that hole. It should be appreciated that in alternative embodiments where the enclosure carries the entire solar energy system and/or other circuitry or systems, the enclosure may be inset, inlaid, or disposed in a recessed space of the supporting structure. For example, side faces 14, top faces 16, and bottom face 18 may have a space cut out for fully or partially receiving the enclosure whereby lighting elements may illuminate solar wind chime 10 system from a recessed area of side faces 14, top faces 16, and/or bottom face 18. Further, enclosure 225 may alternatively be attached to different types of structures or embodiments of the present invention suitable for supporting or carrying enclosure 225.

Components of solar energy system 201, auxiliary electrical power source 211, and electrical subsystem 209 may located and/or operably associated with various locations on each embodiment of solar wind chime, including in body 12, side faces 14, top faces 16, bottom face 18, chimes 20, strings 22, and hanger 24. Additionally, components of solar energy system 201, auxiliary electrical power source 211, and electrical subsystem 209 systems may be located remote from and even significantly distant from each wind chime. Enclosure 225 is preferably located within body 12 in a hollow portion of body 12 between side faces 14, top faces 16, and bottom face 18; however, it should be appreciated that in some embodiments of the present invention, one or more components of solar energy system 201 may be located remote from the hollow portion of body 12. In addition or as an alternative, enclosure 225 may be attached in a hollow portion of striker 31, on ornamental blower 33, or in chimes 20.

Solar collector 215 may be located at any suitable location on or about solar wind chime 10 or remote from solar wind chime 10; however, it is preferred that solar collector 215 be optimally exposed to solar light. Solar collector 215 is preferably attached to top face 16, but may alternately be located remote from top face 16. For those applications in which solar wind chime 10 is primarily a decorative piece displayed indoors, it may be desirable to locate solar collector 215 at a location on solar wind chime 10 that is near or faces a window, or at a location remote from solar wind chime 10 where the remote location may have different ambient lighting conditions. For example, if solar wind chime 10 is located indoors with low levels of light available for conversion to electrical energy by solar collector 215, solar collector 215 may be located outdoors to expose solar collector 215 to more light. It should be understood that sufficiently long electrical conductors 213 are incorporated to achieve remote placement of solar collectors 215 and other remotely located electrical components. For similar reasons, photo cell 223 is also preferably attached to top face 16, but may alternately be located remote from top face 16. In addition or as an alternative, solar collector 215 may be attached to ornamental blower 33 (see FIG. 1B).

Lighting elements 221 are preferably attached to bottom face 18. Lighting elements 221 may also optionally be operably associated with side faces 14, top faces 16, chimes 20 (or other hanging accessories, hanging decorative elements, or hanging devices in combination with or in place of chimes 20), strings 22, and/or hanger 24. Lighting elements 221 preferably illuminate solar wind chime 10 and/or the space in and around solar wind chime 10. Specifically, lighting elements 221 are preferably connected to bottom face 18 and arranged to illuminate solar wind chime 10 in a manner such that chimes 20 and the area below bottom face 18 are substantially illuminated. It should be appreciated that lighting elements 221 may alternatively be located remote from solar wind chime 10 such that lighting elements 221 provide illumination to spaces significantly remote from solar wind chime 10. For example, multiple lighting elements 221 may be located remote from solar wind chime 10 so that the remotely located lighting elements 221 illuminate a path or walkway leading to solar wind chime 10.

It should be appreciated that solar wind chime 10 may alternatively be constructed of optically conductive material such as glass or a translucent plastic. Where an element of solar wind chime 10 is constructed of an optically conductive material, lighting elements 221 may be located within the translucent element such as side face 14, top face 16, bottom face 18, chime 20, string 22, or hanger 24, thereby optionally creating a glowing illumination effect.

In alternative embodiments, multiple lighting elements may be located on or about solar wind chime 10. The multiple lighting elements may be arranged in a manner such that the lighting elements illuminate with strips of illumination. Further, alternate embodiments of solar wind chime 10 may include more than one solar energy system to independently power multiple lighting elements.

Figure 3:
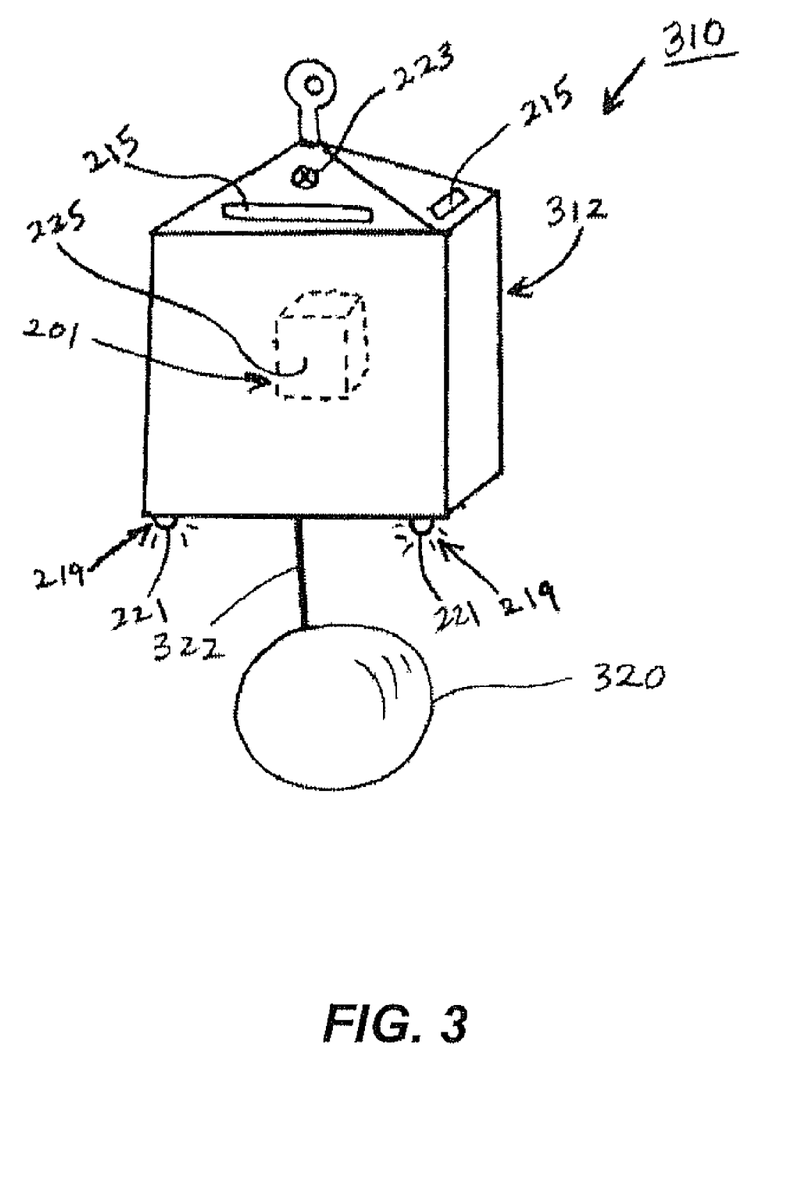
FIG. 3 is a perspective view of an alternate embodiment of a solar-powered wind chime according to the present invention.

Referring now to FIG. 3 in the drawings, an alternate embodiment of a solar wind chime 310 according to the present invention is illustrated. Solar wind chime 310 is similar to solar wind chime 10 and includes a body 312 substantially similar to body 12 in form and function. Solar wind chime 310 also includes solar energy system 201 and lighting subsystem 219. As illustrated, the elements of solar energy system 201 and lighting subsystem 219 are located on body 412 in substantially the same manner as they are attached to body 12. However, solar wind chime 10 does not include chimes 20, but instead, solar wind chime 310 includes a decorative gazing ball 320 hung from body 312 by a string 322. Gazing ball 320 is illustrated as a ball having a smooth silver mirrored finish. Of course, gazing ball 320 may be attached to string 322 in a myriad of ways, but as illustrated, gazing ball 320 is attached at one end of string 322. It should be appreciated that string 322 may alternatively be replaced with any other appropriate means for attaching decorative elements such as gazing ball 320 to body 312. For example, a weaved or knotted hemp feature may be adapted for attachment to body 312 and to carry gazing ball 320.

Figure 4:
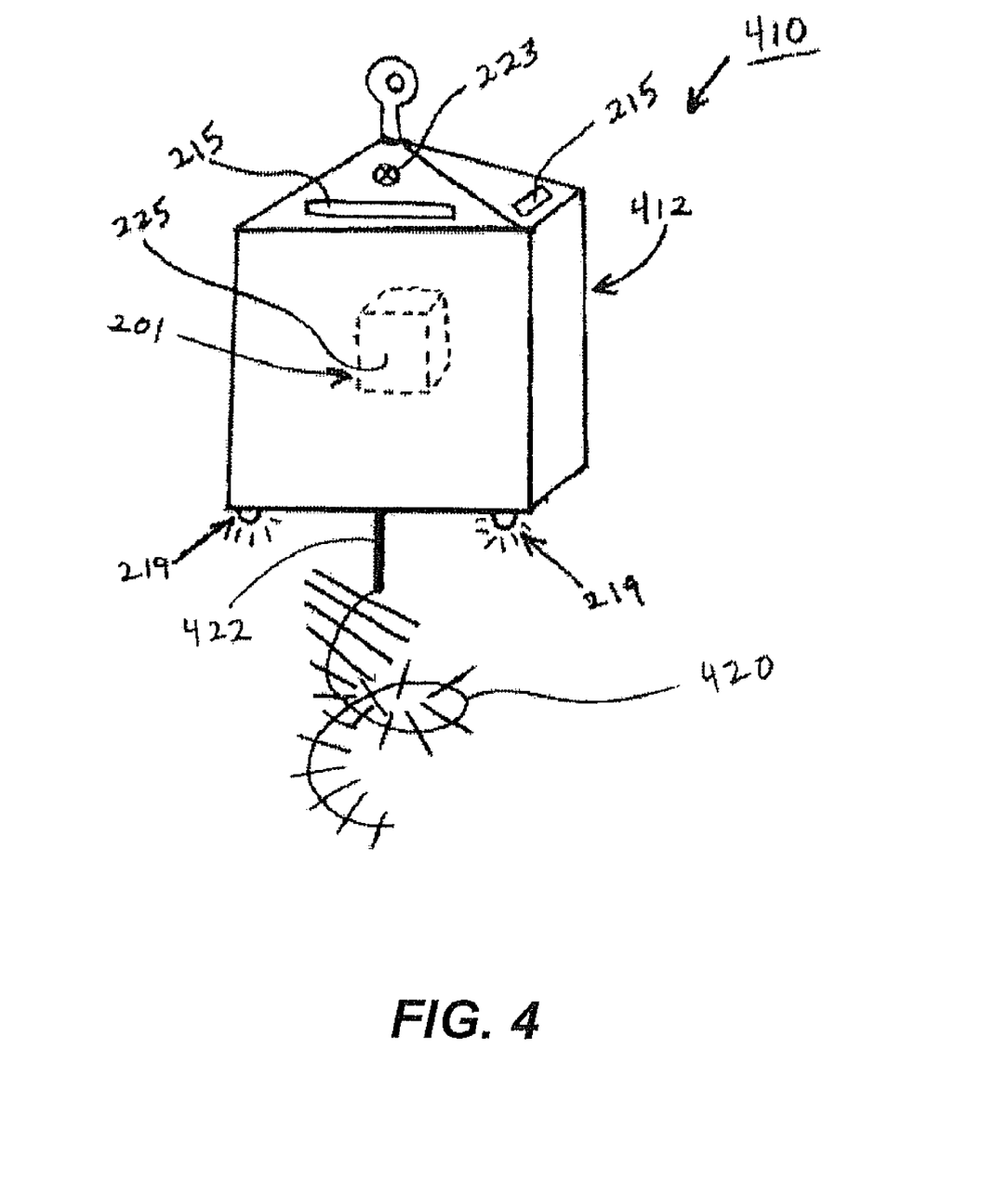
FIG. 4 is a perspective view of an alternate embodiment of a solar-powered wind chime according to the present invention.

Referring now to FIG. 4 in the drawings, an alternate embodiment of a solar wind chime 410 according to the present invention is illustrated. Solar wind chime 410 is similar to solar wind chime 10 and includes a body 412 substantially similar to body 12 in form and function. Solar wind chime 310 also includes solar energy system 201 and lighting subsystem 219. As illustrated, the elements of solar energy system 201 and lighting subsystem 219 are located on body 412 in substantially the same manner as they are attached to body 12. However, solar wind chime 10 does not include chimes 20, but instead, solar wind chime 410 includes a decorative helical feature 420 hung from body 412 by string 422. Helical feature 420 is illustrated as being constructed of a single metal spiral element have discrete metal elements tangentially attached to the spiral element.

Figure 5:
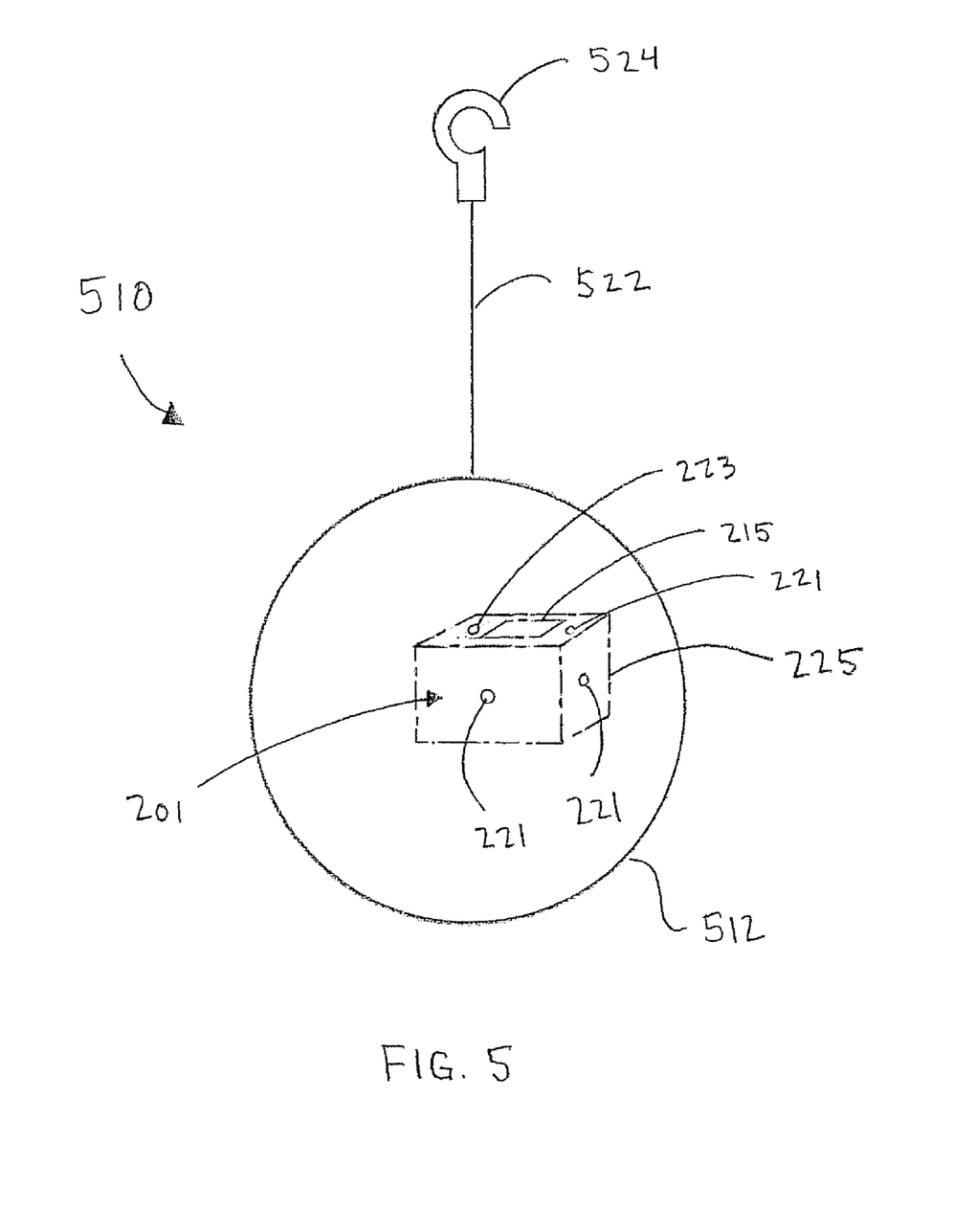
FIG. 5 is a perspective view of an alternate embodiment of a solar-powered wind chime according to the present invention.

Referring now to FIG. 5 in the drawings, an alternate embodiment of a solar wind chime 510 according to the present invention is illustrated. Solar wind chime 510 includes a translucent spherical body 512 which is illustrated as carrying solar energy system 201 and lighting subsystem 219 within body 512. Enclosure 225 is illustrated as housing the elements of solar energy system 201 including lighting elements 221. The translucent ball allows light to reach solar collectors 215 and photocells 223. Similarly, light from lighting elements 221 illuminates body 512 from within and may create a glowing effect. Of course, body 512 may be attached to string 522 in a myriad of ways, but as illustrated, body 512 is attached at one end of string 522 while the remaining end of string 522 is attached to hanger 524.

Figure 6:
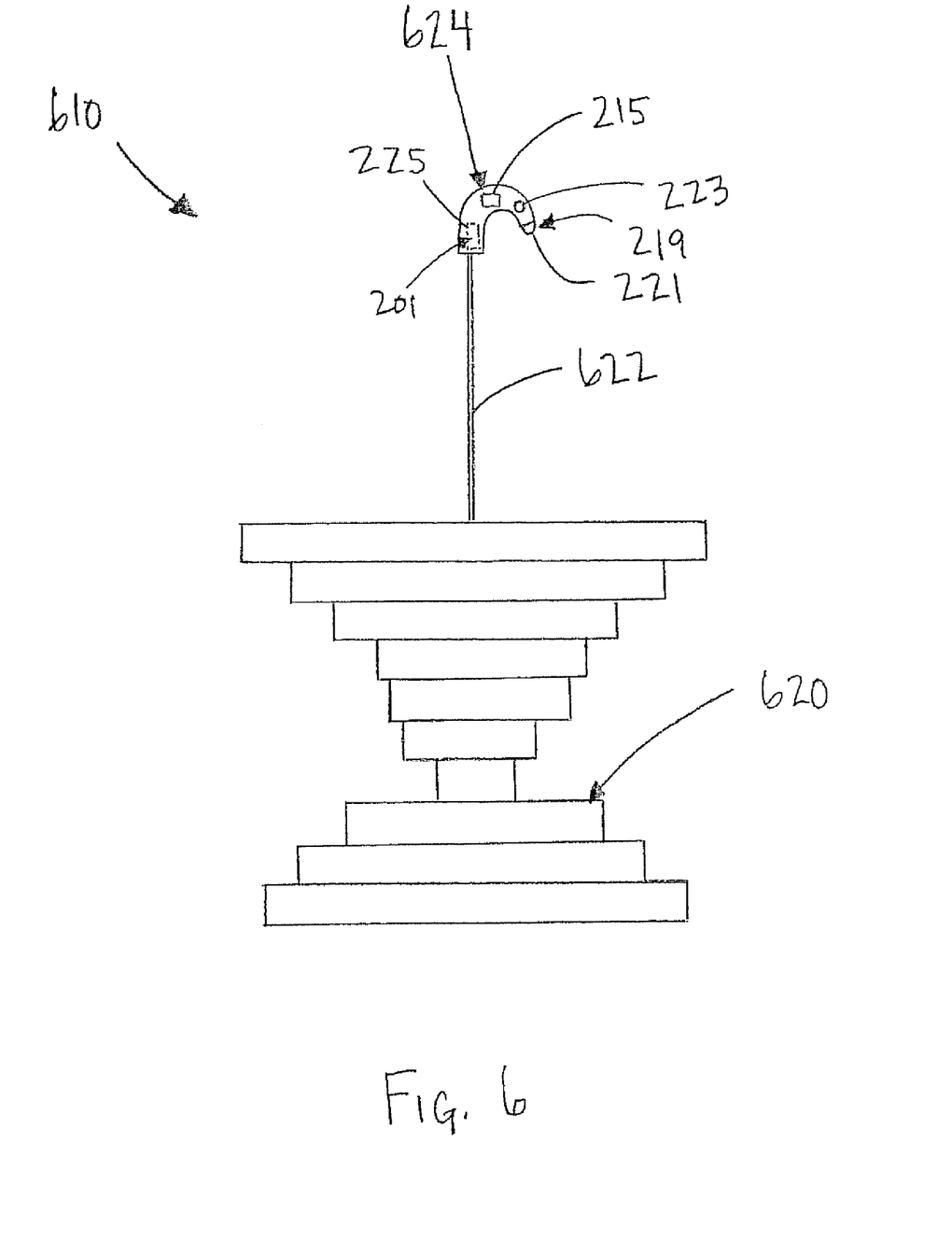
FIG. 6 is a perspective view of an alternate embodiment of a solar-powered wind chime according to the present invention.

Referring now to FIG. 6 in the drawings, an alternate embodiment of a solar wind chime 610 according to the present invention is illustrated. Solar wind chime 610 includes a hanger 624 which is illustrated as carrying solar energy system 201 and lighting subsystem 219 within and on hanger 624. A decorative hanging element 620, illustrated as a series of interconnected discrete wooden bars organized to created a helical shape is illustrated as being suspended from hanger 624 by a string 622. Lighting elements 221 are illustrated as being located at various locations on and about hanger 624 so as to substantially illuminate decorative hanging element 620. Also, photocell 223 and solar collectors 215 are illustrate as being attached to hanger 624.

While this invention has been described with reference to an illustrative embodiment, this description is not intended to be construed in a limiting sense. Various modifications and other embodiments of the invention will be apparent to persons skilled in the art upon reference to the description.

What is claimed is:

1. A solar powered wind chime, comprising:
a wind chime structure comprising:
a body;

at least one chime suspended from the body;

a striker suspended by the body; and a decorative blower suspended by the striker;

an electrical subsystem operably associated with the wind chime structure, the electrical subsystem comprising at least one lighting element carried by the blower; and a solar energy system conductively coupled to the electrical subsystem, the solar energy system comprising:

a rechargeable electrical power source; and a solar energy collection system conductively coupled to the rechargeable electrical power source for recharging the rechargeable electrical power source.

2. The solar powered wind chime according to claim 1, wherein the lighting element illuminates the wind chime structure in a front-lit fashion.

* * * * *